United States Patent [19]

Asano

[11] 4,254,322
[45] Mar. 3, 1981

[54] NARROW WELD-GROOVE WELDING PROCESS AND APPARATUS THEREFOR

[75] Inventor: Isao Asano, Kure, Japan

[73] Assignee: Babock-Hitachi Kabushiki Kaisha, Japan

[21] Appl. No.: 880,108

[22] Filed: Feb. 22, 1978

Related U.S. Application Data

[62] Division of Ser. No. 776,921, Mar. 11, 1977, Pat. No. 4,188,526.

[30] Foreign Application Priority Data

Mar. 15, 1976 [JP] Japan .................................. 51/27178

[51] Int. Cl.³ .............................................. B23K 9/00
[52] U.S. Cl. ..................................... 219/122; 219/136; 219/137 R; 219/137.8
[58] Field of Search ..................... 219/137 R, 74, 122, 219/123, 137.8, 128, 136

[56] References Cited

U.S. PATENT DOCUMENTS

| | | | |
|---|---|---|---|
| 3,328,556 | 6/1967 | Nelson | 219/137 R |
| 3,576,966 | 5/1971 | Sullivan | 219/137 R |
| 3,746,833 | 7/1973 | Ujiie | 219/137 R |
| 3,826,888 | 7/1974 | Garfield | 219/136 X |
| 3,838,243 | 9/1974 | Inagaki | 219/122 |
| 3,992,603 | 11/1976 | Reynolds | 219/74 X |
| 4,090,057 | 5/1978 | Okada | 219/122 |

FOREIGN PATENT DOCUMENTS

| | | | |
|---|---|---|---|
| 3716824 | 6/1960 | Japan | 219/74 |
| 51-73939 | 6/1976 | Japan | 219/137 R |

Primary Examiner—E. A. Goldberg
Attorney, Agent, or Firm—Craig & Antonelli

[57] ABSTRACT

A narrow weld-groove welding process, in which a bare welding wire is fed into a weld groove defined between the opposed surfaces of two pieces of metals for producing a metal arc therein for welding. In this process, a welding wire is subjected to a plastic deformation of a wave form, before being fed into a nozzle hole provided in a contact tip, and then the wire is fed into a nozzle hole, while maintaining elasticity tending to cause waving, whereby the tip of a welding wire being fed through a nozzle exit is automatically waved between the opposed surfaces of metals to be joined, with the tip of wire being alternately faced in the opposite directions, in response to the weaving motion thereof, with the feeding of the welding wire and progress of welding. In addition, the apparatus for use in a narrow weld-groove welding process is also disclosed.

10 Claims, 43 Drawing Figures

NARROW WELD-GROOVE WELDING PROCESS AND APPARATUS THEREFOR

This is a division of application Ser. No. 776,921, filed Mar. 11, 1977, now U.S. Pat. No. 4,188,526, issued Feb. 12, 1980.

This invention relates to a narrow weld-groove welding process and an apparatus therefor, in which two pieces of metals are placed in opposed relation so as to define a weld groove therebetween, and a bare welding wire is fed into the weld groove from a contact tip provided at the tip of a contact tube, thereby producing a metal arc in a shield gas or an atmosphere of a flux for depositing a welding wire on the surfaces of metals to be joined.

Hitherto, there has been proposed an attempt in a MIG (Metal Arc Inert Gas) welding process for thick steel plates, with a narrow weld groove defined between the opposed surfaces thereof, in which process a welding wire of a small diameter is imparted elasticity tending to cause bending, and then the wall surface of a weld groove on one side is welded, followed by welding on the other. However, this attempt suffers from disadvantages in that a contact tip of a contact tube inserted into a weld groove is liable to consume excessively; an arc produced during the welding of a wall of a weld groove on one side is free from weaving, thus resulting in lack of penetration or high temperature cracking; and undesired stability or consistency in feeding a welding wire results. In contrast thereto, there has been proposed an attempt (the Japanese Patent Publication No. Sho50-20031) in which the tip of a welding wire is oscillated or weaved. However, this latter attempt is not a right solution to this problem, because there should be provided a mechanism for weaving a contact tube in a weld groove in its entirety, and thus this attempt is not suitable for a narrow weld-groove welding. A still another attempt is disclosed in the Japanese Patent Publication No. Sho49-17946, in which a welding wire is imparted an elasticity tending to cause bending in a given direction beforehand, and then the welding wire is wound aroung a rocking plate, while the rocking plate is rocked and rotated through a given angle about a feeding axis of a welding wire, so that the tip of the welding wire being fed into the weld groove may be weaved. However, this attempt poses still another problem that a bending and feeding mechanism for a welding wire is large in size, and the undesireable consistency in feeding a welding wire results because various mechanisms have to be inserted or incorporated in a range from a welding wire source to an arc point, and the direction of welding is irreversible due to the exsisting of it is wire bending habit.

The following are various gas shielding processes employable in a narrow weld-groove MIG welding process.

(a) A gas nozzle is placed outside of a weld groove, so that a shield gas is injected through a gas nozzle towards a welding zone, thereby shielding atmosphere.

(b) A gas nozzle surrounding a contact tube is inserted into a weld groove for shielding a weld zone from atmosphere.

(c) Gas is injected from a side hole in a gas nozzle, in addition to the injection of gas through a nozzle tip, as in a manner disclosed in the paragraph (b).

(d) A first shield gas is injected towards a weld zone through a passage running in parallel with a guide path for guiding a welding wire, while a second shield gas is injected from a surface outside of the weld groove.

However, according to processes (a) and (b), a shield gas is injected and supplied from a surface outside of a weld groove, so that a limitation is imposed on a thickness of metals to be joined. According to the processes (b) and (c), a gas nozzle surrounding a welding wire is inserted into a weld groove, so that a limitation is imposed on the width of a weld groove, when the width is desired to be reduced.

Hitherto, several welding processes of this type are known in Japan. (One of example is the Battelle process developed in the U.S. of the Battelle Memorial Institute). A majority of the welding processes of this type use a contact tube adapted to guide a welding wire into a welding groove, except for high current MIG welding processes using a welding wire of a large diameter. The diameter of a welding wire used is on the order of 1 mm, and a welding current which approximates a critical value required for spray transfer of molten metal droplets is selected, with the result that there is necessarily produced spatters (This term is defined as slag or molten droplets splashed from an arc or crater.), so the spatters thus produced cling to the tip of a contact tube or an injection exit of a nozzle, thereby exerting adverse effect on welding characteristics. In addition, a welding current to be used is limited to a value approximating a critical current, so that the resulting weld droplet-transferring mode is not suited for all position welding.

In addition, MIG welding and TIG (tungsten inset gas) welding processes, when used for a narrow weld-groove welding, suffer from defectives as are incurred to the other welding processes, for instance, lack of fushion into a base metal, blow holes, slag inclusion, lack of penetration or fusion in a preceding layer or underlayer of beads.

OBJECT OF THE INVENTION

It is an object of the present invention to provide a narrow weld-groove welding process which avoids the disadvantages confronted by the prior art welding processes.

It is another object of the present invention to provide a narrow weld-groove welding process, which may prevent spatters, and allows a welding position of any type.

It is a still further object of the present invention to provide a narrow weld-groove MIG welding process which may positively effectively shield a weld zone from atmosphere.

It is a yet further object of the present invention to provide a narrow weld-groove welding process and an apparatus therefor, in which inert gas is used not only for the purpose of shielding a welding arc from atmosphere but also for the purpose of changing a contour of a molten pool intentionally, thereby preventing defective welds, when resorting to MIG and TIG narrow weld-groove welding processes.

It is a further object of the present invention to provide an apparatus for use in a narrow weld-groove welding process, providing a welding wire passage, along which a welding wire is fed in the direction substantially in parallel with an axis of wire draw rollers, and furthermore a welding wire may be fed in the direction perpendicular to a plane including two axes of draw rollers.

Figure 2A:
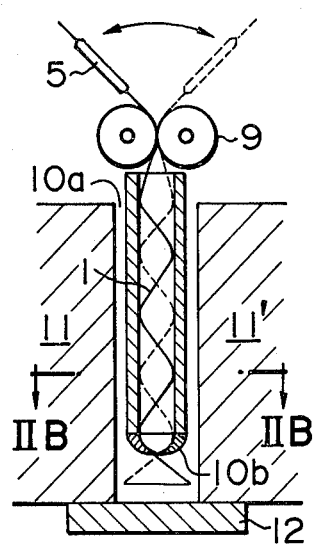
FIG. 2 (A) is a longitudinal cross-sectional view of a contact tube for use in the present invention, FIG. 2-B is a cross-sectional view taken along the line B—B of FIG. 2-A.
Figure 3A:
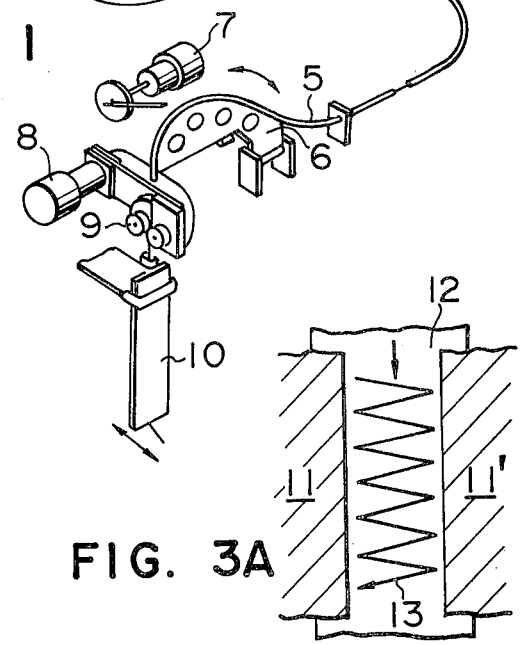
Figure 2B:
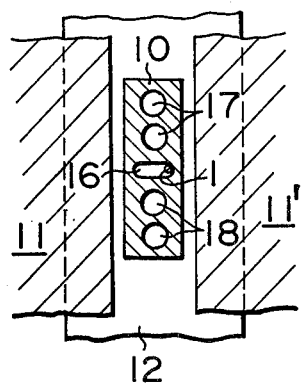
Figure 3B:
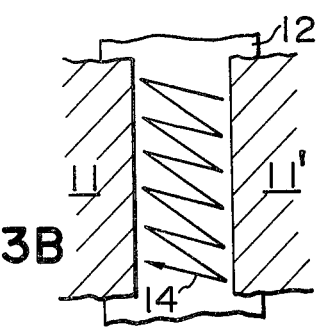
Figure 3C:
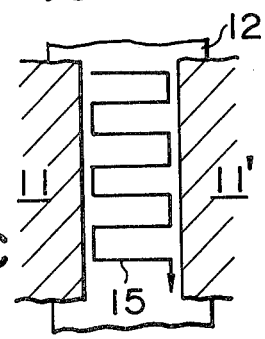
Figure 4:
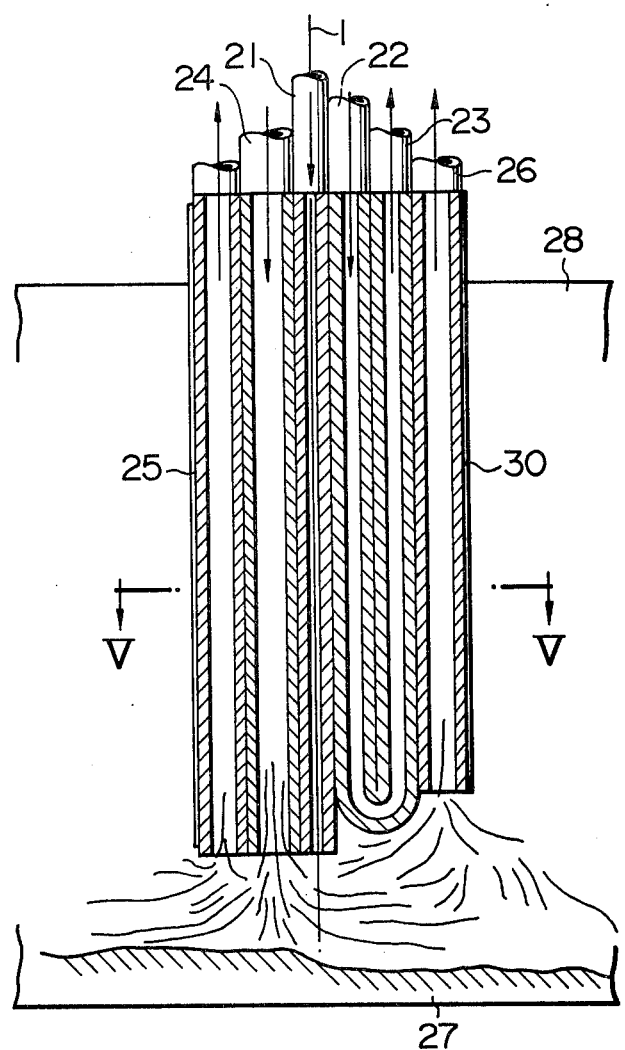
Figure 5:
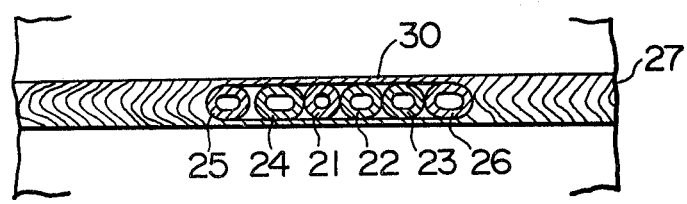
Figure 6:
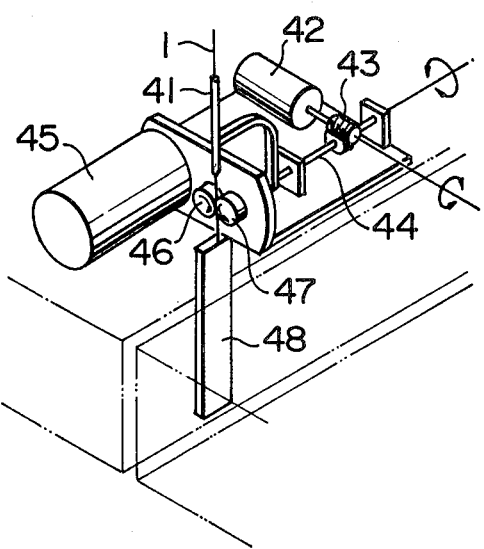
Figure 7:
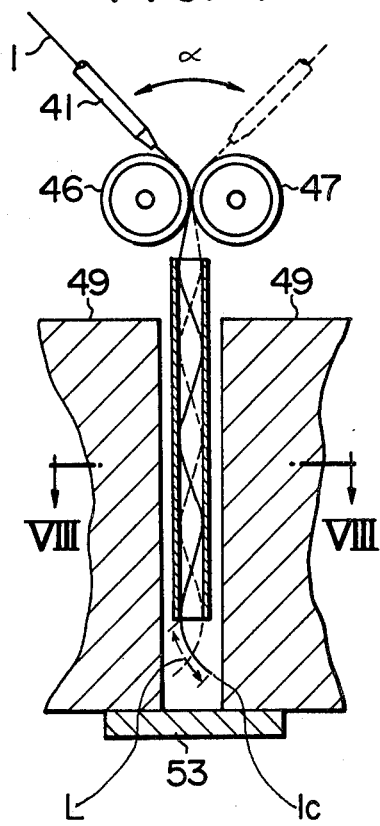
Figures 8A, 8B:
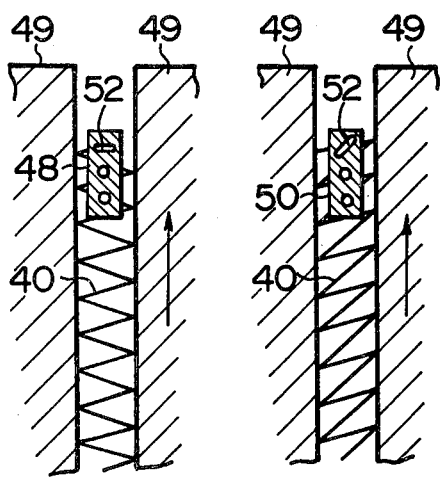
Figure 9:
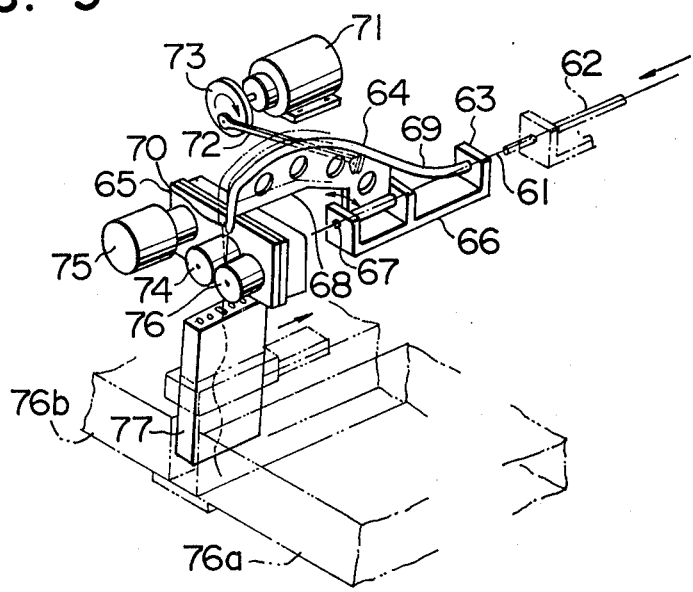
Figure 10:
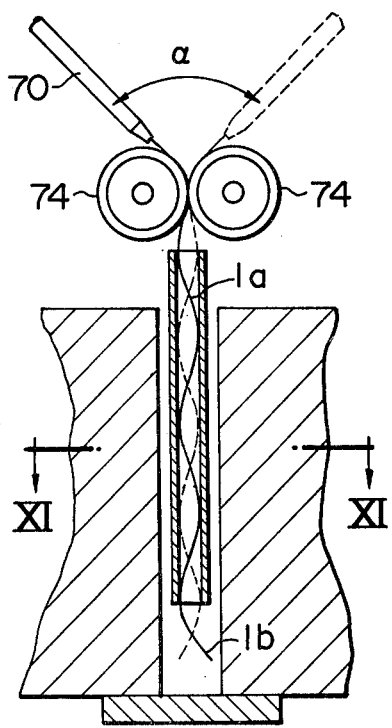
Figure 11:
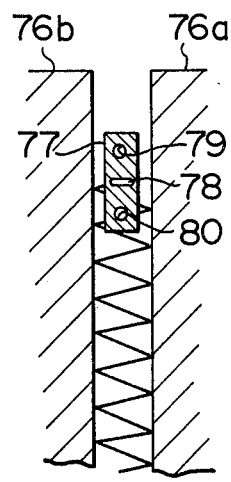
Figure 12:
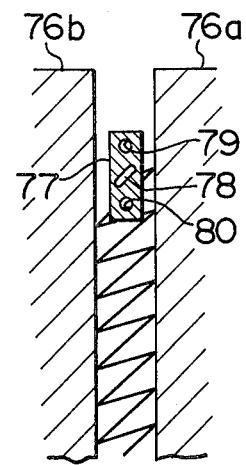
Figure 13:
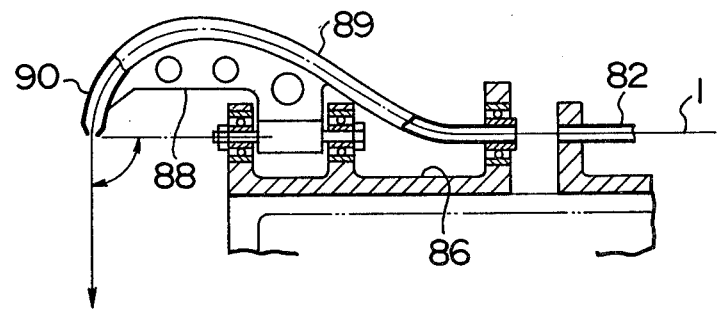
Figure 14:
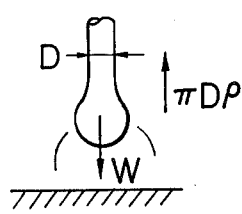
Figure 17A:
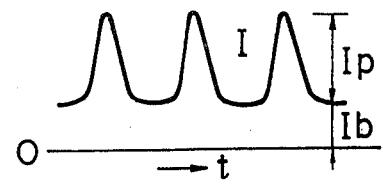
Figure 15:
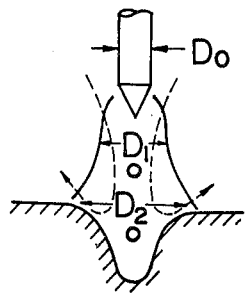
Figure 17B:
Figure 17C:
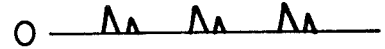
Figure 17D:
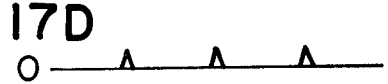
Figure 16A:
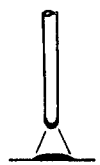
Figure 16B:
Figure 16C:
Figure 16D:
Figures 16E, 16F:
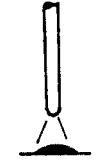
Figure 20A:
Figure 20B:
Figure 20C:
Figure 18:
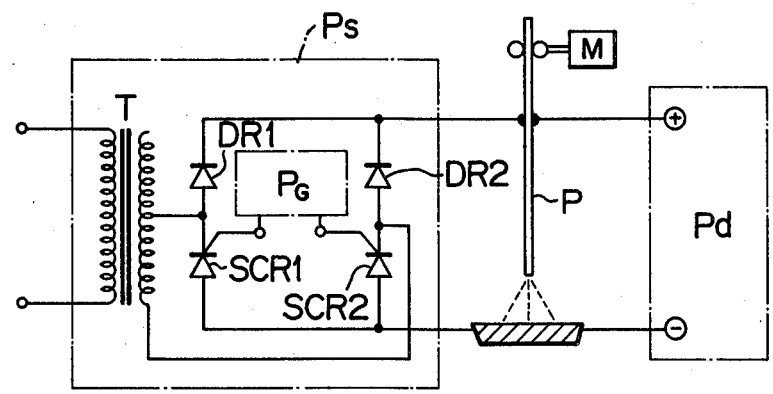
Figure 19:
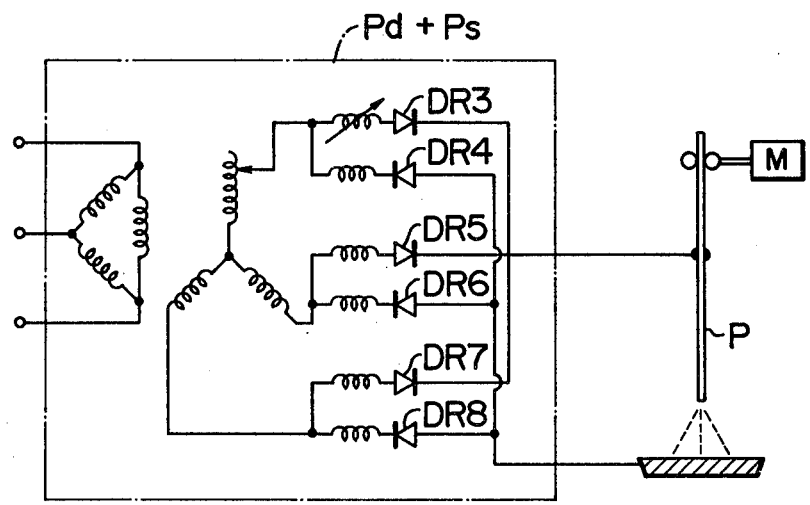
Figure 21:
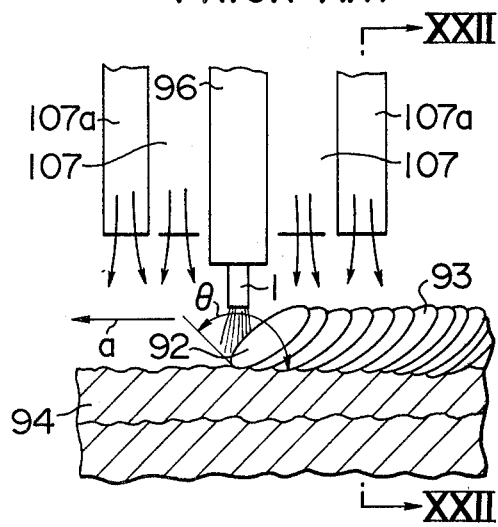
Figure 22:
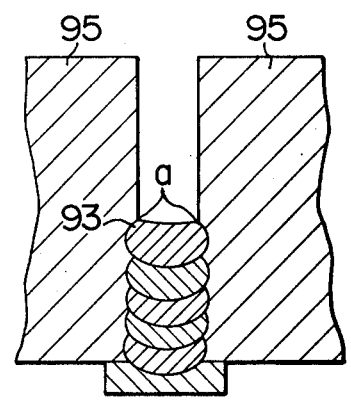
Figure 23:
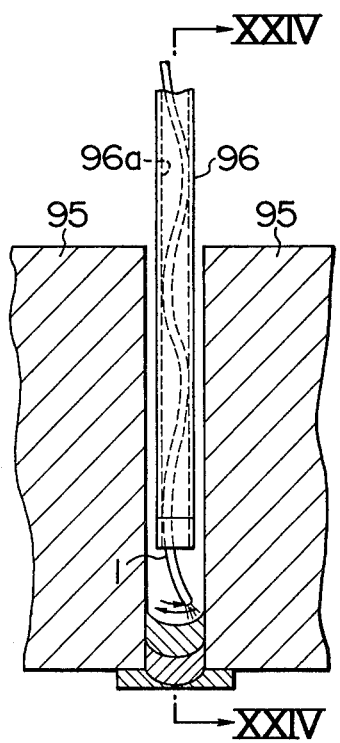
Figure 24:
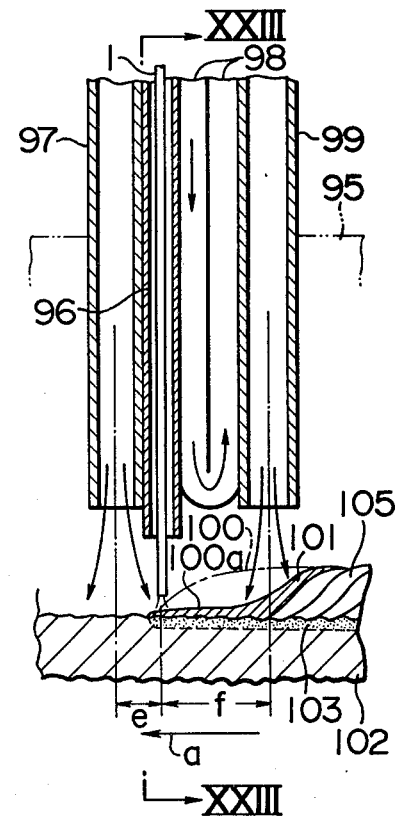
Figure 25:
Figure 28:
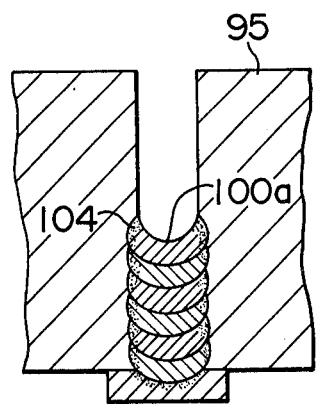
Figure 26:
Figure 27:
Figure 29:
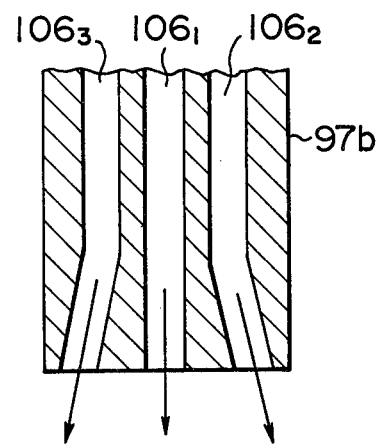

FIGS. 3-A to 3-C are views illustrative of the weaving locuses of an arc, shown in cross section taken along the line B—B of FIG. 2;

FIG. 4 is a longitudinal cross-sectional view showing a nozzle for use in a narrow weld-groove MIG welding process according to the present invention;

FIG. 5 is a cross-sectional view taken along the line V—V of FIG. 4;

FIG. 6 is a perspective view showing the entire arrangement of an apparatus embodying the present invention;

FIG. 7 is a cross-sectional view, partly broken, of a mechanism for imparting a welding wire elasticity tending to cause bending;

FIGS. 8A and B are cross-sectional views taken along the line VIII—VIII of FIG. 7;

FIG. 9 is a perspective view showing the construction of a narrow weld-groove welding apparatus according to the present invention;

FIG. 10 is a cross-sectional view showing a welding nozzle portion, in addition to the formation of a wavy wire and a displacement of the tip of the wire;

FIG. 11 and FIG. 12 are cross-sectional views showing the positional relationship between a weld bead and nozzle openings, taken along the line XI—XI of FIG. 10;

FIG. 13 is an enlarged side view of an arcuate tube in a welding wire supply means according to the present invention;

FIG. 14 is an explanatory view of a force acting on a weld droplet;

FIG. 15 is an explanatory view of a weld droplet;

FIGS. 16A to 16F are explanatory views showing a transient phase of weld droplet from the tip of a wire to a base metal;

FIGS. 17A to D are explanatory views showing a wave form of pulse current, electromagnetic pinch force, and a separating condition of a molten metal;

FIG. 18 is a diagram of one embodiment of a power source circuit for use in the present invention;

FIG. 19 is a diagram showing another embodiment of a power source circuit for use in the present invention; and FIGS. 20A to 20C are transverse cross-sectional views illustrative of welds produced by short-circuiting arc, pulse arc and spray arc;

FIG. 21 is a longitudinal cross-sectional view showing a welding apparatus and beads produced in a narrow weld-groove welding process and apparatus therefor according to the prior art;

FIG. 22 is a transverse cross-sectional view of the bead;

FIG. 23 is a cross-sectional view of the apparatus according to the present invention, taken along the line XXIII—XXIII of FIG. 24;

FIG. 24 is a longitudinal cross-sectional view of the apparatus according to the present invention, taken along the line XXIV—XXIV of FIG. 23;

FIGS. 25, 26, 27 are transverse cross-sectional views of primary or secondary gas nozzle, showing various shapes of gas passages;

FIG. 28 is a transverse cross-sectional view of a bead showing penetration of a weld according to the welding apparatus of the invention; and FIG. 29 is a longitudinal cross-sectional view showing one example, in which the injecting directions of gases through two or more gas passages are varied.

DESCRIPTION OF THE PREFERRED EMBODIMENTS

Figure 1:
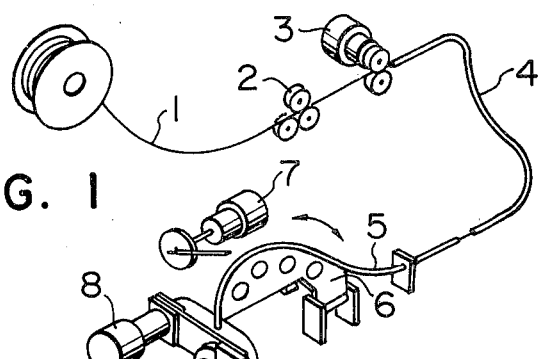
FIG. 1 is a perspective view of an outline of the process and apparatus therefor, according to the present invention.

FIG. 1 is a perspective view showing the entire arrangement of one embodiment of an apparatus according to the present invention. Referring to FIG. 1, shown at 1 is a welding wire, at 2 straightening rollers, at 3 first feeding rollers, at 4 a conduit, at 5 a welding-wire bending guide tube, at 6 a rocking plate, at 7 a rocking motor, at 8 a roller drive motor, at 9 a second feeding rollers, and at 10 a contact tube. The welding wire 1 is staightened by means of the straightening rollers 2 into a linear form, and then delivered from the first feeding rollers 3. The welding wire 1 thus delivered from the first feeding rollers 3 is guided through the conduit 4 and directed into the welding-wire bending guide tube 5. The guide tube 5 runs along the outer periphery of the rocking plate 6 up to the entrance of the second feeding rollers 9. The welding wire 1 thus guided through the guide tube 5 is supplied through the feeding rollers 9 into a nozzle hole provided in the contact tube 10 to be described later. Shown at 8 is a roller drive motor adapted to drive the second feeding rollers 9, and at 7 is a rocking motor adapted to rock the rocking plate 6. When the rocking plate 6 is rocked about its one end in the direction at a right angle to the surface of the figure, the welding wire 1 is imparted a wavy plastic deformation due to a combination of the downward feeding of the wire by means of the second feeding rollers 9 positioned immediately before or downstream of the contact tube 10a with the rocking motion of the rocking plate 6.

FIG. 2 shows a detailed construction of a contact tube for use in the present invention. FIG. 2 (A) is a cross-sectional view thereof and FIG. 2 (B) is a cross-sectional view taken along the line IIB—IIB. In FIG. 2, shown at 1 is a welding wire, at 5 a welding wire bending guide tube, at 9 feeding rollers, at 10a a contact tube, at 10b a contact tip, at 11, 11' metals to be joined, at 12 a backing material, at 16 a nozzle hole of an elongated cross section, at 17 an injection hole through which to inject an inert gas such as argon towards a weld groove, and at 18 water passages for circulating cooling water therethrough.

The nozzle hole 16 is of an elongated cross section in the direction at a right angle to the opposed walls or surfaces of metals 11, 11'. The welding wire 1 is fed through the nozzle hole 16, while maintaining wavy plastic deformation, from the side of the feeding rollers 9 towards the backing material 12. The welding wire 1 which has been fed into a weld groove through the lower opening of a nozzle hole 16 tends to restore a plastic deformation imparted by the feeding rollers according to elasticity of the welding wire along the width of the weld groove, as shown in FIG. 2 (A). The amplitude of weaving of the tip of a welding wire along the width of the weld groove is dependent on a rocking angle of the rocking plate as well as an extension of the welding wire (length of welding wire protruding from the nozzle tip). This permits sufficient penetration of a weld on a corner formed by the backing material 12 and opposed surfaces of metals to be joined. With the progress of welding, an arc produced at the tip of a welding wire automatically reciprocates or weaves between the opposed surfaces of the metals 11, 11′.

FIG. 3 is a cross-sectional view taken along the line IIB—IIB of FIG. 2-A, showing the weaving locus or pattern of an arc in this case. Shown at 13 in FIG. 3 (A) is an arc locus in case the nozzle hole 16 is of en elongated cross section in the direction at a right angle to the opposed surfaces of metals 11, 11′, as shown in FIG. 2. An arrow mark shows the advancing direction of welding. Shown at 14 in FIG. 3 (B) is an arc locus, in case the center line of an elongated cross section of the nozzle hole 16 is inclined to the direction at a right angle to the opposed surfaces of metals 11, 11′, in which the arc locus is not symmetric with respect to the advancing direction of welding. However, in this case, as well, there may be achieved a stable arc locus, and thus this version of welding process may be used as required, with the achievement of deposited metals of a high quality. Shown at 15 in FIG. 3 (C) is an arc locus resulting, in case the center line of an elongated cross section of the nozzle hole 16 runs in the direction at a right angle to the opposed surfaces of metals 11, 11′ as in the case of FIG. 3 (A), and yet the rotational speed of the rocking motor 7 is so controlled as to be stopped intermittently, thereby forming a rectangular wave form of an arc locus. As a result, the dwelling time of an arc on the opposed surfaces of metals 11, 11′ may be extended, thereby insuring sufficient penetration of welds on corner portions. In addition, the procedures (B) and (C) may be combined in use. The adjustment of dwelling time of an arc may be controlled by changing a mode of speed control of the rocking motor 7. As is apparent, the position of an arc may be automatically weaved between the opposed surfaces of metals, with the progress of welding and feeding of a welding wire, and in addition the dwelling time of an arc on the opposed surfaces of metals may be adjusted as desired, so that the welding according to the present invention permits efficient welding and provides a wide application. In other words, all position welding may be applied to pipes of a large thickness and diameter, as well as to the build-up welding other than the narrow weld-groove welding.

The following numerical values are given as examples of the narrow weld-groove welding according to the present invention:
thickness of metals to be joined: 150 mm
length of weld groove in the welding direction: 1000 mm
width of weld groove: 10 mm
arc locus: FIG. 3 (a)
weaving width or amplitude: about 7 mm
Inert gas: Ar mixed $CO_2$
flow rate of gas:
  Ar: 40 litr/min,
  $CO_2$: 10 litr/min
welding speed: 300 mm/min
In the above welding condition, there may be obtained a weld of a quality acceptable for JIS—one grade.

As is apparent from the foregoing description of the present invention, a welding wire is imparted a wavy plastic deformation, immediately before being fed into a contact tube, and then the wire is fed through the nozzle hole of an elongated cross section, while maintaining a wave form, thereby enabling a weaving action of a welding wire within a weld groove, so that an arc may be automatically weaved between the opposed surfaces of metals. As a result, a consistent feeding of welding wire becomes possible, even in case the thickness of metals are increased, and in addition the weaving direction of an arc may be maintained constant. In addition, the weaving direction of an arc may be changed to meet an intended application, thus allowing complete penetration of a weld on the walls of a weld groove as well as welding in any position. Meanwhile, description has been had to the MIG welding process. However, the present invention is by no means limited to this instance but may be applied to submerged arc welding and the like. In short, the present invention may be applied with the same result to any type of welding, as far as a bare welding wire is used for a narrow weld-groove welding.

Embodiments of nozzles for use in narrow weld-groove MIG welding will be described with reference to FIGS. 4 and 5.

Referring to FIGS. 4 and 5, shown at 21 is a contact tube made of a copper alloy, an outer diameter and inner diameter thereof being 5 mm, and 3 mm, respectively. Shown at 22 is a cooling water feeding tube and, at 23 a cooling water return tube. Accordingly, cooling water is circulated in arrow directions through the tubes 22, 23 for cooling a nozzle and improving electric conductivity thereof, in addition to prevention of burning of a heat resisting, electrically insulating material 30 to be described hereinafter. Shown at 24 is a shield gas supply tube, and thus a gas containing 80% argon gas, and 20% carbon dioxide gas may be directed to a weld groove portion for injection towards a deposited metal. Shown at 25, 26 are impure-gas suction and discharge tubes for introducing and discharging impure gases into and from a weld groove. A vacuum is maintained in the impure gas suction and discharge tubes 25, 26 for introducing impure gases under suction, so that even a shield gas injected through a nozzle exit of a small diameter may be well spread around a weld at a low flow speed, with the aid of the aforesaid suction, thereby protecting a weld, without exerting an adverse effect on a deposited metal. The tubes 21 to 26 are arranged flatwise, and brazing is applied to respective tubes to be joined together, after which the outer surfaces of the tubes are covered with a heat resisting, electrically insulating material 30, such as glass fibers or the like. The diameters of the respective tubes 21 to 26 are so selected as to be equal to the outer diameter of the contact tube 21. Shown at 27 is a weld bead. In the embodiment, the width of a weld groove is selected as being 8 mm. Shown at 28 is a metal to be welded. Shown at 1 is a welding wire of 1.2 mm in diameter. Although not shown, the welding wire 1 is imparted a wavy plastic deformation, immediately before being fed into the contact tube 21, thus allowing a weaving motion of the tip of a welding wire according to elasticity thereof, after being fed into a weld groove. This insures sufficient penetration of a weld into a base metal.

As can be seen from the foregoing, there are arranged flatwise in side by side relation the contact tube 21 adapted to feed a welding wire into a weld groove, the cooling water feeding tube 22 and its return tube 23 which are positioned sidewise thereof, shield gas feeding tube 24, and impure gas suction and discharge tube 25, and another suction and discharge tube 26, which are positioned on the opposite sides of the tubes 1, 22, 23, respectively. As a result, the width of a weld groove may be reduced to a considerable extent. In addition, impure gases around a weld portion may be introduced under suction and discharged outside, so that despite shield gas being injected through a nozzle exit of a small diameter, the gas may be directed towards the bottom of a weld groove following a satisfactory flow pattern. This improves the purity of a shield gas, and the shield gas may be fed only through a weld groove towards its bottom. In addition, gas suction and discharge openings are provided adjacent to the bottom of a weld groove, so that no limitation arises for the thickness of metals to be joined, while permitting safisfactory feeding of a shield gas. Furthermore, since a fume or smoke produced during welding may be discharged, observation and monitering of an arc may be attained with ease.

As a welding power source for supplying a current to the welding wire 1, there has been proposed a pulsed arc welder not shown, which may supply a pulse wave current of 120 Hz. A combination of the aforesaid power source with a welding nozzle according to the present invention permits the complete transferring of a droplet in a relatively low current range, thereby avoding spatters, with the result of freedom of adhesion of spatters to a contact tip and a shield-gas exit of a nozzle, unlike the prior art welding apparatus.

In this embodiment, a weld zone in the bottom portion of a weld groove alone is shielded, and tubes are joined flatwise, so that a narrow weld-groove welding is enabled for metals having an increased thickness, thus providing a weld zone of a consistent quality with the accompanying many industrial advantages.

Description will now be given of the second embodiment of the narrow weld-groove MIG welding process according to the present invention.

The feature of this embodiment is that a welding wire is imparted a wavy plastic deformation, immediately before being fed into a nozzle hole of an elongated cross section, and then the wire is fed into the nozzle hole while maintaining elasticity tending to cause waving, so that the tip of a welding wire being fed through the tip of a nozzle is weaved automatically, with the direction of the tip being alternately changed in opposite directions, in response to the weaving motion thereof.

FIG. 6 shows an entire arrangement of the apparatus embodying the present invention.

FIG. 7 shows, in cross section, a mechanism for providing a welding wire an elasticity tending to cause bending or curl. Referring to FIGS. 6 and 7, shown at 41 is a rocking nozzle, at 42 a drive source for the rocking nozzle, i.e., a rocking motor, at 43 a worm gear adapted to rotate, along with a rotary shaft of the rocking motor 42, at 44 a rocking shaft adapted to rotate in response to the rotation of the worm gear 43 and coupled to the worm gear 43, at 45 a welding-wire feeding motor serving as a drive source for the feeding rollers 46, at 47 press rollers adapted to rotate in response to the rotation of the feeding rollers 46 in contact with the outer peripheries of the feeding rollers, at 48 a contact tube adapted to introduce a welding wire 1 into its nozzle hole, which wire is being fed from the feeding rollers and press rollers 47, and at 49 metals to be joined.

The welding wire 1 is supplied from above the rocking nozzle 41, while the rocking nozzle 41 effects a rocking motion following a sector pattern in a plane as shown in FIG. 7, through the medium of worm gear 43 and rocking shaft 44, according to the cyclic normal and reverse rotations of the rocking motor 42. This imparts a wavy deformation to the welding wire 1. The welding wire 1 which has passed through the rocking nozzle 41 is then passed through the feeding rollers 46 and the press rollers 47, wherein the wire is imparted a downward force and forced into a nozzle hole in the contact tube 48 positioned immediately downstream of rollers 46, 47 and then the wire 1 is moved through the nozzle hole, while maintaining elasticity to cause waving, and then into the weld groove. The welding wire which has entered the weld groove restores its wavy deformation according to its elasticity. In this respect, the nozzle hole provided in the contact tube 48, as shown at 52 in FIG. 8, is of an elongated circular cross section, so that the weaving motion of the weld wire is restricted by a major axis of the elongated circular cross section.

FIG. 8 is a cross-sectional view taken along the line VIII—VIII of FIG. 7. FIG. 8 (A) refers to a case where the directon of a major axis of an elongated circular cross section is at a right angle to the width of a weld groove, while FIG. 8 (B) refers to a case where the direction of a major axis is slant to the width of the weld groove. Shown at 40 in FIG. 8 are arc locuses in the respective cases. More particularly, the welding wire 1 which has been fed into a weld groove through a lower exit of a nozzle hole 52 of an elongated circular cross section, while maintaining a wavy plastic deformation, tends to be directed along the major axis of the elongated circular cross section according to the elasticity of the wire. In this case, the amplitude of the weaving of a welding wire is controlled by a rocking angle a of the rocking nozzle and an extension L of the welding wire from the tip of a nozzle in a weld groove. This permits sufficient penetration of a weld into the corner portions formed between a backing material 53 and opposed surfaces base metals 49. In addition, with the progress of welding, an arc produced at the tip 1c of a welding wire automatically weves between the opposed surfaces of metals to be joined. Shown at 40 in FIG. 8 is a weaving locus of an arc in this case, while an arrow designates the advancing direction of welding. In case the major axis of an elongated circular cross section of a nozzle hole 52 is slant to the vertical direction, as shown in FIG. 8 (B), then the arc locus resulting is not symmetric with respect to the advancing direction of welding. However, a stable or consistent arc locus may be attained in this case as well, so that a deposited metal of a good quality may be obtained according to its intended application. For instance, the arc locus shown in FIG. 8 (A) is best suited for a flat position welding, vertical position welding and overhead position welding and the like, while the arc locus of FIG. 8 (B) is suited for a horizontal position welding.

As is apparent from the foregoing description of this embodiment, a welding wire for MIG welding process is imparted a wavy plastic deformation, immediately before being fed into a contact tube, and then moved through the nozzle hole having an elongated circular cross section, while maintaining a wavy deformation, thereby permitting the weaving motion of the tip of a welding wire within a weld groove, with the result that an arc may be automatically weaved between the opposed walls of the weld groove. As a result, there may be achieved stable or consistent feeding of a welding wire into the weld groove, with the weaving direction of an arc maintained constant. In addition, the weaving direction of an arc may be changed as required, and there may be achieved sufficient penetration of a weld into the walls of a weld groove. The aforesaid embodiment according to the present invention solved many problems experienced with the prior art welding processes, in which a welding wire is imparted an elasticity tending to cause bending in a given direction by means of bending rollers, and then the welding wire is wound around a rocking plate, while the rocking plate in its entirety is rocked and rotated through a given angle about the feeding axis of a welding wire, thereby causing the tip of a welding wire to weave within a weld groove. More specifically, the following disadvantages of the prior art processes may be avoided i.e., a bending and feeding mechanism for a welding wire is complex and large in size; since various mechanisms are placed between a welding-wire-feeding source and an arc point, there results the failure in stability in feeding of a welding wire, because of an elasticity tending to cause bending in the wire in a given direction, the advancing direction of welding is not reversible; and the weaving of a welding wire is hindered due to spatters clinging to the tip of a contact tube during the welding, with the accompanying failure in weaving motion of an arc within a weld groove.

Description will be turned to an embodiment of a welding apparatus, in which the formation of a wavy welding wire and the feeding thereof are accomplished at one time.

Referring to FIGS. 9, 10, 11 and 12, the welding wire 1 is supplied from a wire reel past a conduit 62 to a welding device 63 according to this embodiment. In this case, there may be provided a wire feeding means having a drive rollers additionally, for achieving smooth paying—out of a wire from a wire reel. The welding device 63 consists of a welding-wire supply means 64 and roller means 65 including a welding nozzle. These components are supported on a frame not shown. The welding wire fed into the conduit 62 is then fed into an arcuate conduit 69 running along the periphery of a frame 68 secured to a shaft 67 of the frame 66. The wire-receiving end of the arcuate conduit 69 is rotatably supported by the frame 66, with the attaching portion thereof being positioned on an extension line of the shaft 67. The configuration of the arcuate conduit 69 is smoothly curved, so that the welding wire may be delivered from the other end, i.e., an end 70 on the side of a nozzle smoothly. The frame 68 swings through a given angle at a given speed about the shaft 67, being driven by an connecting arm 72 coupled to a speed change geared motor 71. The axis of a swinging motion of the frame 68 through a swing angle α is positioned on a plane including the two axes of two rollers. The shaft of a drive roller of the above two rollers is connected to a reduction gear shaft within a casing of the roller means 65, which shaft is coupled to the change geared motor 75. The welding wire 1 is formed into a wavy wire 1a having a given pitch which depends on the swing angle and speed of the arcuate conduit 69 in the wire supply means 64, and the r.p.m. of the roller 74 (wire feeding rate) in the roller means 65, which is associated therewith. The wavy welding wire 1a is passed through a welding nozzle 77, and one end 1b thereof extends from the contact tube hole 78 outside in a manner the wire may contact the inner wall surface of the tube 78 for supplying a current therethrough, thereby forming a steady arc in a weld groove portion to provide weld beads. Thus, the wire is consumed progressively. The contact tube hole 78 should be of a cross section having a major axis and minor axis for accommodating the feeding of a welding wire, for instance, elongated circle, ellipse, and rectangle. The major axis should run at a right angle or a slant to the direction to form beads, depending on a welding condition. Two or more inert gas supply holes 79 and cooling water passages 80 are provided in the welding nozzle 77 adjacent to the welding nozzle hole 78. In this manner, a continuous but stable arc is produced between the end of the wavy wire 1a and a weld zone, thereby providing welds free of a defect in the metal plates 76a, 76b. In short, the welding device according to this embodiment of the present invention features that there are provided a welding wire supply means adapted to swing about one axis, and a set of roller means adapted to continuously supply a welding wire into a welding nozzle hole, thereby drawing the welding wire from the welding wire supply means into a wavy form.

According to this embodiment, a wavy wire may be readily obtained by means of the welding-wire supply means which swings through a given angle at a given speed, and two sets of roller means. As a result, this enables the narrow weld-groove MIG welding, particularly for thick plates, without causing a defect, and with a desired rapidness and positiveness. The two sets of roller means in this welding device enables the formation and drawing of a wavy wire at a time, and the welding device is simple in construction, free of a trouble and easy in handling. The axis 61 of the conduit 62 is coaxial with the shaft 67 of the swinging guide means 68. The direction of the axis 61 should be substantially in parallel with the axes of a set of rollers 74, 76. This fact is essential to the effect that a welding wire drawn through the rollers 74, 76 be waved and maintain its wave configuration in a common plane accurately, and that the welding wire be smoothly introduced into the contact tube hole 78. A low profile welding device may be provided, because of the feeding of a welding wire which runs substantially in parallel with the axes of rollers. In addition, the welding device permits vertical-position welding. The axis 61 should preferably be positioned in a plane including the axes of two rollers 74, 76, in parallel with the shafts of rollers 74, 76.

In short, the following features are of importance:

(1) A process in which a welding wire is drawn by roller means and supplied to a welding nozzle in a wave form, characterized in that the welding wire is supplied from a direction which is substantially in parallel with the shafts of rollers, past a swing guide means to the roller means.

(2) A welding wire supply device for use in a welding device, in which a welding wire is drawn by roller means in a wave form, and supplied to a welding nozzle, characterized by a swing guide means adapted to receive a welding wire from the direction parallel with the shafts of rollers in the aforesaid roller means and supply same to the aforesaid roller means.

According to this embodiment, the feeding of a welding wire my be accomplished smoothly, and a low profile welding device may be achieved. In addition, welding positions other than flat position are enabled. Particularly, there may be achieved welds, rapidly and positively, in a narrow weld-groove MIG welding process, without a defect.

In the welding device shown in FIGS. 9, 10, 11, 12, the arcuate conduit 69 running along the outer periphery of the swing guide means 68 changes, through an angle of 90°, the direction of a welding wire which has been directed through the conduit 62 in parallel with the metal plates 76a, 76b (in the horizontal direction) and allows downward running of the wire at a right angle to a plane including axes of two rollers 74. However, an excessive change in the direction of a welding wire in an attempt to reduce the size of a welding device results in deformation in a wave form of the welding wire to be supplied to a welding nozzle, thereby hindering smooth movement of a welding wire through the contact tube hole 78. Accordingly, the curvature of the arcuate conduit 69 should be smooth, and in addition, the radius of curvature of the conduit should be such as not to cause deformation beyond the elastic limit. The wire which is fed out of the arcuate conduit shown in FIG. 13 restores its linearity, and is then waved due to the swinging motion of the swing guide means 68 by the cooperation of the rollers 74.

Because of the arcuate conduit of the aforesaid arrangement, the feeding of a welding wire may be accomplished smoothly, and there may be achieved a low profile welding device, thus enabling various welding positions and formation of a desired wave form for a welding wire. Particularly, there may be obtained a satisfactory narrow weld-groove MIG welding without a defect, rapidly, positively.

Another embodiment of the narrow weld-groove MIG welding process enabling all position welding is shown in FIGS. 14 to 20, which avoids spattering and other shortcomings in the prior art MIG welding of this type. The feature of this embodiment lies in a pulsed-arc welding process which enables the complete spray transferring of molten metal droplets in a low current range, i.e., an arc is produced between a welding wire and metals according to a current, in which a large current is superposed on or added to a D.C. basic current for a short time cyclically, for the narrow weld-groove welding process.

In general, in the case of arc welding, a base metal is fused due to heat from an arc, while the tip of a welding wire is also heated and drops in a liquid form. A mode in which the molten metal produced on a welding wire is transferred to the side of a base metal is closely related to the results of welding.

When a welding current falls in a low range, as shown in FIG. 14, a molten metal produced due to hear from an arc is formed at the tip thereof in a spherical form. Thus, when the weight W of a molten metal ball is increased to an extent that it can no longer be supported by a surface tension $\pi D\rho$ (D: diameter, $\rho$: density) acting on a root portion of the molten metal ball, then the molten metal ball drops by its gravity. In the actual arc welding, there is no such an ideal transferring of a droplet, i.e., the transferring due to a surface tension and gravity alone, i.e., with the freedom of other type of external forces. In the welding operation using a large current, the behavior of a molten metal is closely governed by an electromagnetic contracting force (electromagnetic pinch force) produced by a welding current.

When a large current at a high current density flows through a liquid conductor, then a strong electromagnetic pinch force acts thereon, with its contracting pressure being in proportion to a current density, so that in the case of a MIG arc as shown in FIG. 15, a contracting pressure peaks at the tip of a welding wire of a diameter $D_o$, while the contracting pressure is found not so high at the lower end $D_2$ (the top surface of a crater). In case the internal pressure in a liquid conductor varies in this manner, then the liquid under a high pressure is necessarily forced towards a lower pressure portion, thus causing the transferring of a liquid. As a result, in the case of an arc welding using a large current and high current density, a molten metal at the tip of a welding wire is splashed in the form of droplets into an arc space at an gravitational acceleration of several tens G, whereupon there is produced a strong air stream of a speed of over 1000 m/sec, which is directed from a high pressure portion of a small diameter towards a low pressure portion of a large diameter. This state, wherein a molten metal is forcibly taken off the tip of a welding wire by such an electromagnetic pinch force and then transferred to a base metal in the form of fine particles, is referred to as a spray type transfer. The spray type transfer uses a large current, so that a depositing rate is high and the penetration is deep, insuring highly efficient welding of thick plates.

In case an arc current is lower than a given level, then a molten metal can no longer be ejected only by an electromagnetic pinch force acting on a molten metal, from the tip of a welding wire. In other words, a surface tension force of a molten metal can no longer be negligible relative to the electromagnetic pinch force. In a current range lower than a given critical value, a molten metal produced at the tip of a welding wire assumes a round droplet form as shown in FIG. 16-A, which in turn is grown to a certain size with the time lapse, and then droops as shown in FIG. 16-B to contact a base metal. When the welding wire is brought into contact with the base metal, then a greater part of a droplet is transferred to the side of the base metal according to a tension force acting on the surface of a molten pool, as shown in FIG. 16-C, while the remaining part of the molten metal assumes a thin line or string form, as shown in FIG. 16-D. A large current flows through the aforesaid string-form portion, so that a strong electromagnetic pinch force acts locally thereon and hence the string form portion is quickly necked or broken, whereupon an arc is automatically produced again as shown in FIG. 16-E, returning to the state shown in FIG. 16-A. In this manner, in a current range lower than a given critical value, there alternately takes place the production of an arc and shortcircuiting cyclically, and every time of the occurance of shortcoming, a droplet of a small amount is shifted to the side of a base metal. The above transferring mode is referred to a short-circuiting type transfer. In short, during the production of an arc, the amount of a current flowing is less, so that an electromagnetic force acting on a droplet is not so great, while in the terminating phase of the shortcircuiting, the aforesaid electromagnetic force becomes cosiderably large, thereby interrupting or breaking a stream of a molten metal to permit an arc to be produced again, thus initiating a repeated cycle of arc-shortcircuiting-arc. (30 to 150 cycles/sec.) Meanwhile, since an arc of a shortcircuiting type is produced in a small current range, and even if a large circuiting current flows during a shortcircuiting duration corresponding to half a welding duration, the heat is not generated by an arc, so that heat input to a base metal is less than in the case of a spray type arc, and hence the penetration into the base metal is shallow.

According to a pulsed arc welding, a large current is superposed or added cyclically but for a short time on or to a base current as small as a shortcircuiting current, thereby forcibly effecting spray transfer. The object of the pulse arc welding is to enable a spray arc mode even in a low current range which could be obtained only in a shortcircuiting arc mode. FIG. 17 are diagrammatic views showing wave forms of welding currents in a pulsed arc welding. In FIG. 17 (A), Ib represents a substantially flat wave d.c. which may be obtained at a d.c. arc welding source of a general type, and is referred to as a basic current. Ip is a pulsed current to be superposed on or added to the basic current, so that a synthesized current I of the both currents serves as an arc discharge current.

The value of a basic current Ib is not so large as to cause spray shifing due to an electromagnetic pinch force produced by itself, rather falls in a shortcircuiting arc range, as compared with the diameter of a welding wire. However, when a pulsed current Ip is superposed on or added to Ib, then a strong electromagnetic force acts on a molten metal for a short time, whereupon the molten metal is forcible detached from the tip of a welding wire. An electromagnetic pinch force acting on a conductor of a given diameter is proportional to the square of a current value, so that the maximum pinch force corresponding to a variation in the current I as shown in FIG. 17 (A) is such as shown in FIG. 17 (B). When a time-integrated electromagnetic force exceeds a given value so as to allow a molten metal to overcome its surface tension, thereby being detached from the tip of a welding wire, then spray of one droplet is enabled. In case a peak current value is sufficiently large, then as shown in FIG. 17 (C), a droplet is ejected with a slight time delay from a current peak, and as the case may be, two or more droplets are ejected for one pulse. However, when a pulsed current is low, then as shown in FIG. 17 (D), there results a time lag until the droplet is ejected.

FIG. 18 shows a circuit diagram of one embodiment of a power source means for use in the present invention. According to this circuit arrangement, a basic d.c. current is supplied from a conventional type d.c. welding source, and then a pulsed current is added thereto from a pulse generating source. Shown at Pd in FIG. 18 represents a conventional d.c. source, which is of a so-called d.c. constant voltage type. Shown at Ps is a power source for generating pulses. In this embodiment, a both-side wave rectifying bridge circuit including a pair of silicon rectifiers DR1, DR2 and a pair of thyristers SCR1, SCR2 is connected to a single phase variable voltage type transformer T. By adjusting a pulse signal generating circuit PG adapted to on-off control gate signals from the thyristers SCR1, SCR2, a generating phase of a main pulse current or a width of a pulse current may be adjusted or pulse generating cycle per second may be set equal to or doubled as compared with a power source frequency. The value of a wave front of a pulse current may be adjusted by adjusting the secondary voltage of the transformer T. P represents a welding wire, and M represents a welding wire feeding device.

The value of pulse current and its generating cycle may be adjusted so as to be suited for an individual welding condition. However, it is recommendable to use a generating cycle several times as high as a power source frequency. In other words, it is recommendable to allow to progressively switch between 50, 100 cycles per second for a 50 cycle power source, and 60 and 120 cycles per second for 50 cycle power source. In the actual welding operation, the shortcircuiting cycles/second of a shortcircuiting arc or the droplet generating cycle/second of a spray arc falls in a range of 50 to 150 per second. Accordingly, better results may be achieved in a pulsed arc, when the forcible spray transfer is effected at cycles as above with pulsed currents.

FIG. 19 shows a circuit diagram of another embodiment of a power source for use in the present invention. This circuit allows the generation of a basic current and a pulse current from a single d.c. arc power source. In the circuit of this embodiment, a d.c. power source voltage is intentionally brought out of equilibrium, thereby generating a pulse current. In FIG. 19, silicon rectifiers DR3 to DR8 are to form a three-phase all wave rectifying circuit. In this respect, a voltage of one phase of an alternate current for DR3 is made variable by means of a sliding mechanism, or made higher than a voltage of the other two phases, thereby rectifying the unbalanced three-phase voltages for obtaining a pulse current of a desired wave front value.

The following are the advantages of this embodiment: As has been described earlier, according to the pulse welding, a large current is superposed on a basic current as small as a shortcircuiting current cyclically for a short time, thereby effecting a spray transfer forcibly. The object is to enable a spray arc mode even in a lower current range, which mode can not be obtained only in a shortcircuiting arc mode. The actual advantage of pulse arc welding lies in the possibility of all position welding, such as vertical position welding, horizontal position welding, flat position welding and the like at a high speed, high efficiency and reliability. FIGS. 20A, 20B, 20C show typical welding bead cross sectional configurations with reference to a short-circuiting arc, pulsed arc and spray arc. The spray arc welding is suited for a welding operation at a large current and a high speed, providing a deep penetration, while short-circuiting arc welding is less in penetration because of use of a small current, and subject to a limitation on a welding speed or depositing rate, thus resulting in insufficient penetration, when the thickness of metals to be joined is increased. On the other hand, in the case of all position welding such as vertical position welding, horizontal position welding and the like, if a molten pool in arc welding is too large, then a molten metal tends to drop. For this reason, even in the case of welding of metals of an increased thickness, a current as small as 150 A should be used, while the current on this order falls in a short-circuiting arc range, and would result in sufficient penetration. In contrast thereto, the pulsed arc welding permits a deep penetration for an average current in terms of the same level, and in addition a molten metal at the tip of a welding wire is shifted in a spray form to the side of a base metal, thus facilitating the movement of a wire, with the accompanying improved efficiency in welding. As has been described earlier, in the case of pulsed arc welding, a molten metal at the tip of a welding wire can be detached off the tip of the wire by a force several times or several tens times as high as the gravitational acceleration G, because of a strong electromagnetic pinch force produced due to a high current density, so that it is of no importance whether a droplet is ejected upwards against the gravity (overhead position welding) or drops in the direction of gravity (flat position welding).

One of numerical examples is given as follows:

In the case of a thick plate butt-welding (a weld groove width is 8 mm, thickness of a plate is 200 mm, length of a plate is 6000 mm), a shield gas consisting of argon and carbon dioxide gas of 80:20 is used at a flow rate of 75 litr/min. In the case of flat position welding, the welding current used ranges from 240 to 260 A. In the case of horizontal position welding, a welding current ranges from 140 to 180 A. In these cases, a continuous stable welding may be carried out for each of welding positions.

The welding process according to this embodiment takes over the positions of the prior art electro-slag welding and manual welding, and find its wider application, because the narrow weld-groove MIG welding process according to the present invention provides a stable welding condition, despite the weaving motion of a welding wire.

Further embodiment according to the present invention is shown in FIGS. 21 to 29, which is intended to improve the defects in welds obtained from a narrow weld-groove MIG welding according to the present invention.

FIG. 21 gives detailed observation of a molten pool and an arc in MIG welding. A molten pool 92 is positioned under the wire 1, being somewhat biased against the advancing direction of welding. With the progress of welding, there are formed beads 93 which are continuous, solidified layers of metal, following a molten pool in the direction against the advancing direction of welding. A molten metal assumes an elliptic form in cross section, because of a large surface-tension, as shown in FIG. 21. A contacting angle $\theta$ formed by the surface of a bead and the surface of an under-layer 94 is larger than 90°, thus providing poor wettability. The example shown in FIG. 22 which is a cross-sectional view taken along the line XIII—XIII of FIG. 21 provides poor wettability between the bead 93 and the metal 95, presenting a danger of undercut and slag inclusion on a corner portion (a).

Hitherto, the supply of inert gas is effected through a passage 107 around a contact tube 96, as shown in FIG. 21, or through a second passage 107a surrounding the passage 107 for sufficiently shielding a weld zone from atmosphere. The object of the supply of inert gas in the prior art welding is to shield a weld zone from air, rather than to affect a molten pool, and thus is not intended to give some influence on the molten pool intentionally.

According to this embodiment of the invention, there are provided a process and an apparatus therefor, in which inert gas is used not only for shielding a weld zone from air but also for changing the contour of a molten pool intentionally, thereby preventing defects in welds obtained according to the narrow weld groove MIG, TIG welding processes.

This embodiment according to the present invention will be described with reference to MIG welding. FIG. 23 is a cross-sectional view of a welding apparatus, as viewed from the front in the advancing direction of welding, taken along the line XXIII—XXIII of FIG. 24. The transverse cross section of the contact tube 96 is of an elongated rectangular cross section, and is formed with a hole 96a of a rectangular cross section for accommodating a welding wire therethrough. The contact tube 96 is high in electrical conductivity, while a welding wire which has been waved according to the device described earlier is supplied from above through the hole 96a, continuously. Thus, beads are formed, with an arc produced at the lower end of the wire which is being weaved transversely of a weld groove, and the welding wire is consumed, accordingly.

FIG. 24 is a cross-sectional veiw taken along the line XXIV—XXIV of FIG. 23, in which a primary gas nozzle 97 is provided in close contact with a contact tube forwardly in the advancing direction of welding. An inert gas passage as shown in FIG. 24 is of an elongated rectangular cross section 97a as shown in FIG. 25, or is of a plurality of gas passages provided in a block 97b as shown in FIG. 26. Alternatively, two or more tubes may be joined together as shown in FIG. 27 in the block form 97c. Cooling water tubes 98 are positioned in close contact with the contact tube 96 in the rear thereof, as viewed in the advancing direction of welding, while a secondary gas nozzle 99 is positioned in further rear position of the cooling water tube 98 in close contact therewith. The secondary gas nozzle should be of a shape similar to that of the primary gas nozzle 97. In addition, the configuration of a gas passages therefor may be either one of those shown in FIGS. 25 to 27.

Description will be had to a molten pool produced in a welding apparatus according to this embodiment. The longitudinal cross sectional built-up contour of a molten pool in the prior art welding, in which a weld zone is shield from air by inert gas, is shown by a one point chain line at 100. In this embodiment, the secondary gas nozzle in a welding apparatus is positioned at a given spacing from the end of a welding wire, so that a molten pool 101 is spread under a gas pressure from the secondary gas nozzle, so that the surface of a molten pool assumes a concave cross sectional contour as shown at 100a. In addition, the primary gas nozzle is positioned in a given positional relationship to the end of a welding wire, so that a molten metal, in a molten pool which has been forced forwards by inert gas being injected from the secondary gas nozzle, is pushed back by the inert gas, thereby providing a concave cross sectional contour 100a, as shown in FIG. 28. Satisfactory penetration is achieved between a high temperature molten metal and an under-layer 102 in contact therewith, and a sufficient penetration 104 is also achieved between a molten metal and a base metal, as shown at 100a in FIG. 28, being free of undercut and slag inclusion. In this manner, there may be formed beads 105 which are free of deflect, as the welding nozzle goes on. In addition, for the primary or secondary gas nozzle provided with two or more gas passages, as shown in FIG. 29, there may be provided gas passages $106_1$, $106_2$, $106_3$ which are adapted to deflect the direction of gas being injected, thereby effectively pushing back the surface of a molten pool or spreading the molten pool. Alternatively, the flow rates of gas through these gas passages may be varied, thereby facilitating deformation of a molten pool.

Assume that a distance of an axis of a contact tube to an axis of the primary gas nozzle is "e", and a distance of the axis of the contact tube to the axis of the secondary gas nozzle is "f". Then, f>e. In other words, best results may be obtained, in case f is larger than e. The cooling water tube 98 should not necessarily be limited to the instance shown, but may be such as to surround the contact tube 96, so that the distances f and e may be suitably selected. It is preferable that the primary gas nozzle, contact tube, cooling water tube, and secondary gas nozzle be in intimate contact with each other for improving the heat radiation and the thermal conductivity thereof, in addition to reduction in size of the welding apparatus. This embodiment provides the following features:

(1) A narrow weld-groove welding process, in which the surface of a molten pool is spread by gas being injected through a secondary gas nozzle positioned in the rear of a contact tube as viewed in the advancing direction of a contact tube, and a molten metal in a molten pool is pushed back by gas being injected through a primary gas nozzle in front of the contact tube.

(2) A narrow weld-groove welding apparatus, in which one or more primary gas nozzles are positioned in front of a contact tube, while a cooling water tube is positioned in the rear of the contact tube in intimate contact therewith, and one or more secondary gas nozzles are positioned in the rear of the cooling water tube.

(3) A narrow weld-groove welding apparatus, in which there are provided two or more primary gas nozzles having varying injecting directions of inert gas, and second gas nozzles having varying injecting directions of inert gas.

(4) A narrow weld-groove welding apparatus, in which a distance of an axis of a contact tube to an axis of the secondary gas nozzle is larger than a distance of an axis of the contact tube to the axis of a primary gas nozzle.

According to the present invention, the surface of a molten pool may be suitably spread and pushed back, thereby providing a concave surface for a molten pool; sufficient or proper penetration may be achieved for a base metal and an under-layer; slag inclusion, undercut, blow holes may be minimized; the size of a welding apparatus may be reduced; flat position welding may be accomplished with ease; and horizontal position welding and other positions welding are also accomplished with ease, with the aid of a well retained molten pool due to the narrow weld groove.

What is claimed is:

1. A narrow weld-groove welding apparatus, comprising:
    a contact tube and means for advancing said contact tube;
    secondary gas supply means for spreading the surface of a molten metal in a molten pool laterally relative to an advancing direction of the contact tube by gas being injected therethrough, said secondary gas supply means including a secondary gas nozzle means positioned in the rear of the contact tube at a first distance from a center longitudinal axis of the contact tube as viewed in the advancing direction of said contact tube and constructed for enabling a free flow of gas therefrom; and
    primary gas supply means for pushing back said molten metal in said molten pool relative to said advancing direction by gas being injected therethrough, said primary gas supply means including a nozzle means positioned in close proximity to the front of said contact tube at a second distance from said center longitudinal axis of the contact tube as viewed in said advancing direction, said second distance being less than said first distance, and said primary gas nozzle means being constructed for enabling a free flow of gas therefrom.

2. A welding apparatus as set forth in claim 1, wherein said apparatus further comprises:
    a cooling medium tube and its return tube for circulating cooling medium therethrough and positioned adjacent to one side of a contact tube, said contact tube being adapted to guide and feed a welding wire into a weld groove;
    a shield gas supply tube positioned adjacent to the other side of said contact tube for supplying a shield gas to said weld groove; and
    an impure-gas suction and discharge tube positioned outwardly of said cooling-medium return tube and said shield gas supply tube for introducing impure gas therein and discharging same outside;
    said tubes being all arranged flatwise in parallel relation to each other, and the entire surfaces of said tubes being all covered with heat-resisting, electrically insulating material.

3. A welding apparatus as set forth in claim 1, comprising a welding wire supply means for supplying a welding wire to said contact tube, wherein said welding wire supply means is provided with a rocking guide means which receives a welding wire from the direction which is substantially in parallel with the axis of said roller means and supplies same to said roller means.

4. A welding apparatus as set forth in claim 1, comprising a welding wire supply means for supplying a welding wire to said contact tube, wherein said welding wire supply means is provided with a welding-wire rocking guide means having a smooth passage which allows a deformation of said wire within an elastic limit.

5. A narrow weld groove welding apparatus, according to claim 1, wherein:
    said primary gas nozzle means comprises one or more primary gas nozzles positioned in front of the contact tube in intimate contact therewith;
    a cooling medium tube is positioned in the rear of said contact tube in intimate contact therewith; and
    said secondary gas nozzle means comprises one or more secondary gas nozzles positioned in the rear of said cooling medium tube in intimate contact therewith.

6. A narrow weld-groove welding apparatus, as set forth in claim 4, wherein said primary gas nozzle means comprises two or more primary gas nozzles having varying gas injecting directions for directing inert gas so as to produce said pushing back of the molten metal; and secondary nozzle means comprises gas nozzles having varying injecting directions for directing inert gas so as to produce said lateral spreading of the molten metal.

7. A narrow weld-groove welding process, comprising the steps of:
    feeding a welding wire through a contact tube, forming a weld bead and advancing said contact tube, said steps further including the steps of:
    spreading the surface of a molten metal in a molten pool laterally relative to an advancing direction of the contact tube by gas being injected through a secondary gas nozzle positioned in the rear of said contact tube at a first distance from said welding wire as viewed in the advancing direction of said contact tube; and
    pushing back said molten metal in said molten pool relative to said advancing direction by gas being injected through a primary gas nozzle positioned in close proximity to the front of said contact tube at a second distance from said welding wire, said second distance being less than said first distance.

8. A welding apparatus according to claim 1, wherein said primary and secondary supply means are operable for supplying inert gas to said primary and secondary nozzle means at varied pressures for producing said pushing back and lateral spreading of the molten metal, respectively.

9. A welding method according to claim 7, wherein said steps of pushing back and spreading of the molten metal are performed by directing said gas through said primary and secondary nozzle means in varied directions.

10. A welding method according to claim 7, wherein said steps of pushing back and spreading of the molten metal are performed by directing said gas through said primary and secondary nozzle means at varied pressures.

* * * * *

UNITED STATES PATENT AND TRADEMARK OFFICE
CERTIFICATE OF CORRECTION

PATENT NO. : 4,254,322
DATED : March 3, 1981
INVENTOR(S) : Isao ASANO

It is certified that error appears in the above-identified patent and that said Letters Patent are hereby corrected as shown below:

On the Title Page, left-hand column:

[73] "Babock-Hitachi Kabushiki Kaisha," should read:

--Babcock-Hitachi Kabushiki Kaisha,--

[30] Under the heading "Foreign Application Priority Data", following "Mar. 15, 1976 [JP] Japan ...... 51/27178", insert the following:

--Jul. 22, 1976 [JP] Japan ............... 51/96881
Jul. 27, 1976 [JP] Japan ............... 51/88685
Sep. 27, 1976 [JP] Japan .............. 51/114675
Oct. 19, 1976 [JP] Japan .............. 51/124494
Oct. 19, 1976 [JP] Japan .............. 51/124495
Nov. 22, 1976 [JP] Japan .............. 51/139556--

Signed and Sealed this

Twelfth Day of October 1982

[SEAL]

Attest:

GERALD J. MOSSINGHOFF

Attesting Officer

Commissioner of Patents and Trademarks